March 11, 1941.   E. E. WEMP   2,234,460
CLUTCH AND LEVER SYSTEM THEREFOR
Original Filed July 29, 1938   3 Sheets-Sheet 2
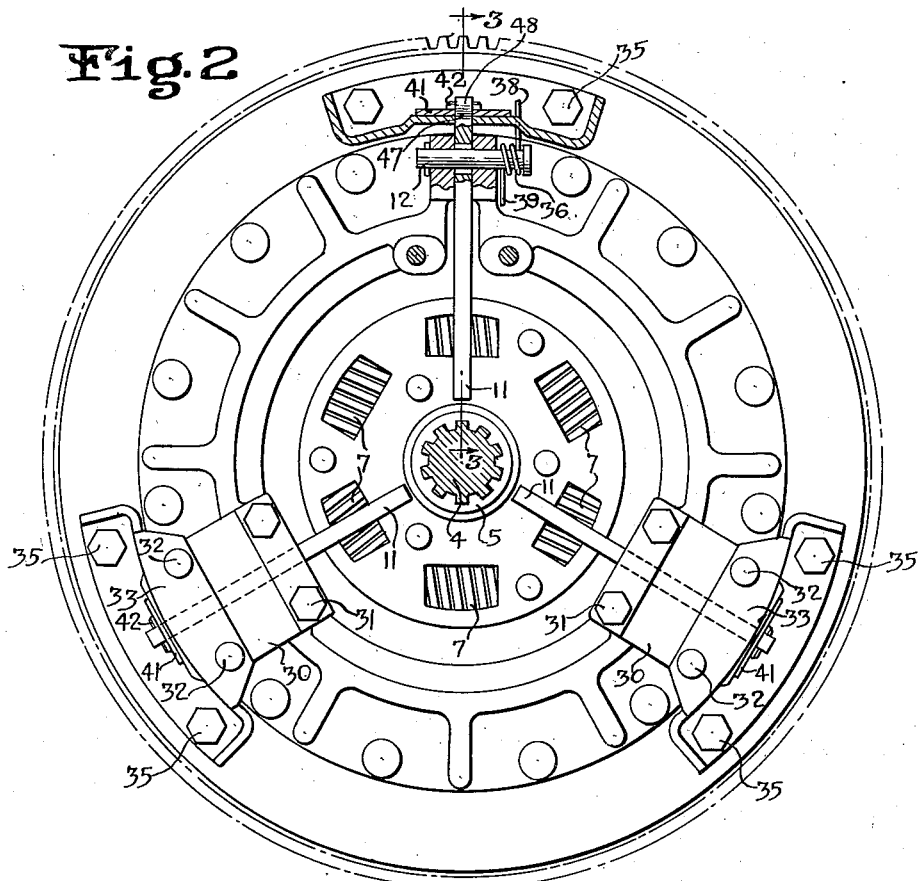
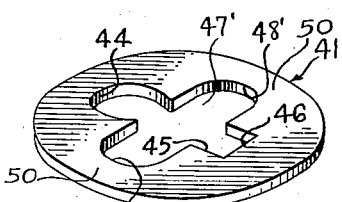
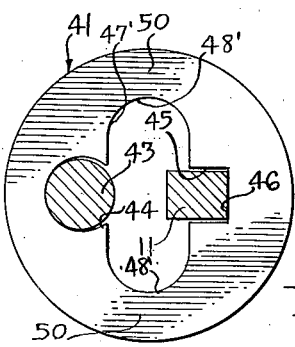
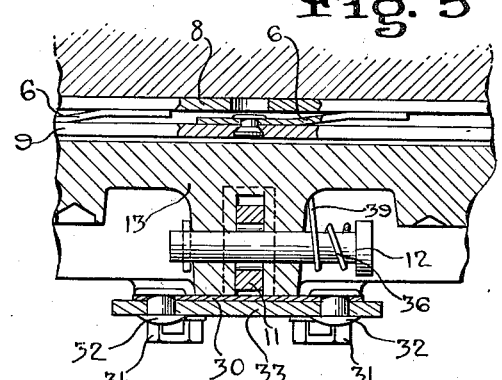
INVENTOR.
Ernest E. Wemp
BY Barnes, Kisselle, Laughlin & Raisch
ATTORNEYS.

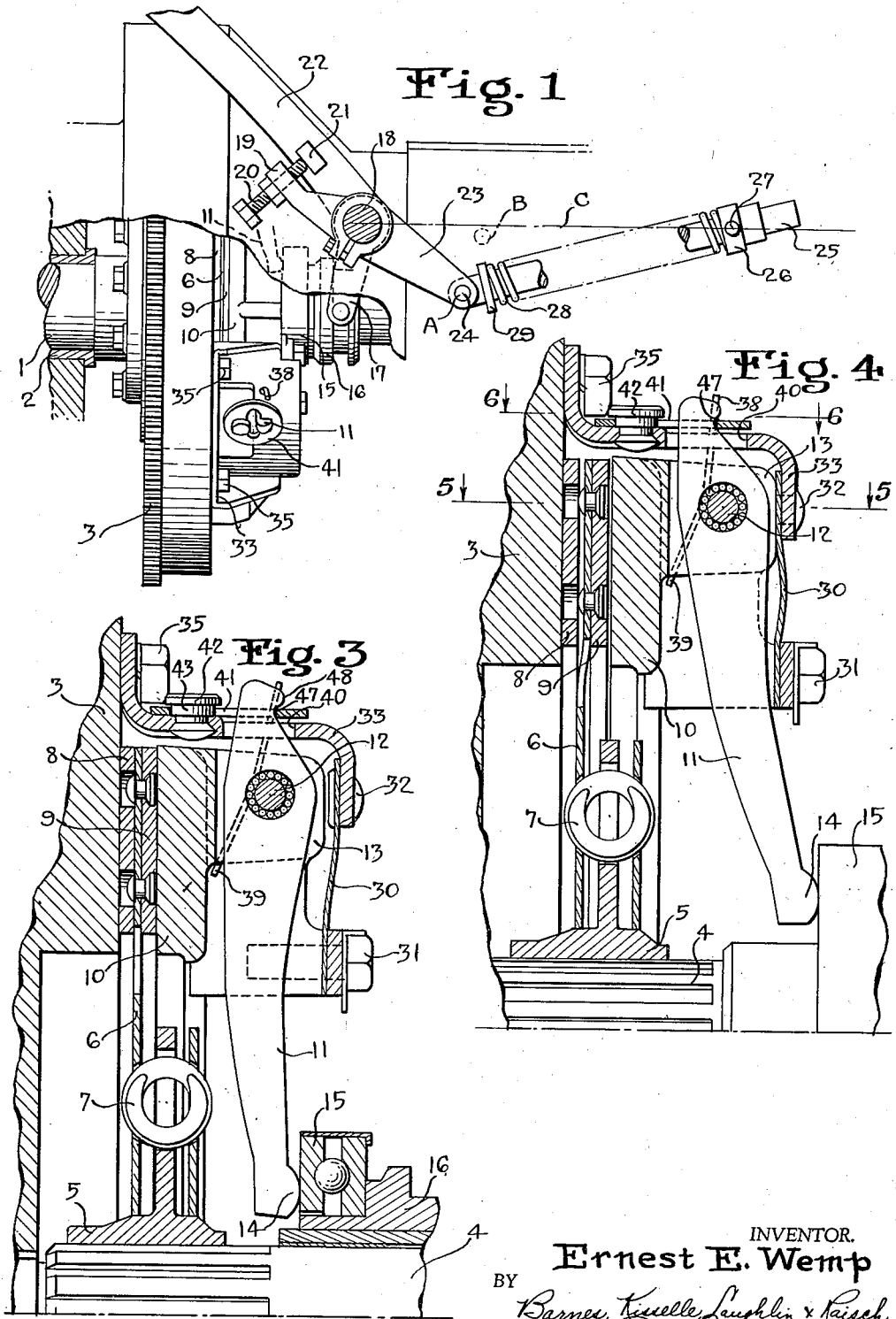

March 11, 1941.                E. E. WEMP                 2,234,460
                       CLUTCH AND LEVER SYSTEM THEREFOR
                  Original Filed July 29, 1938    3 Sheets-Sheet 3
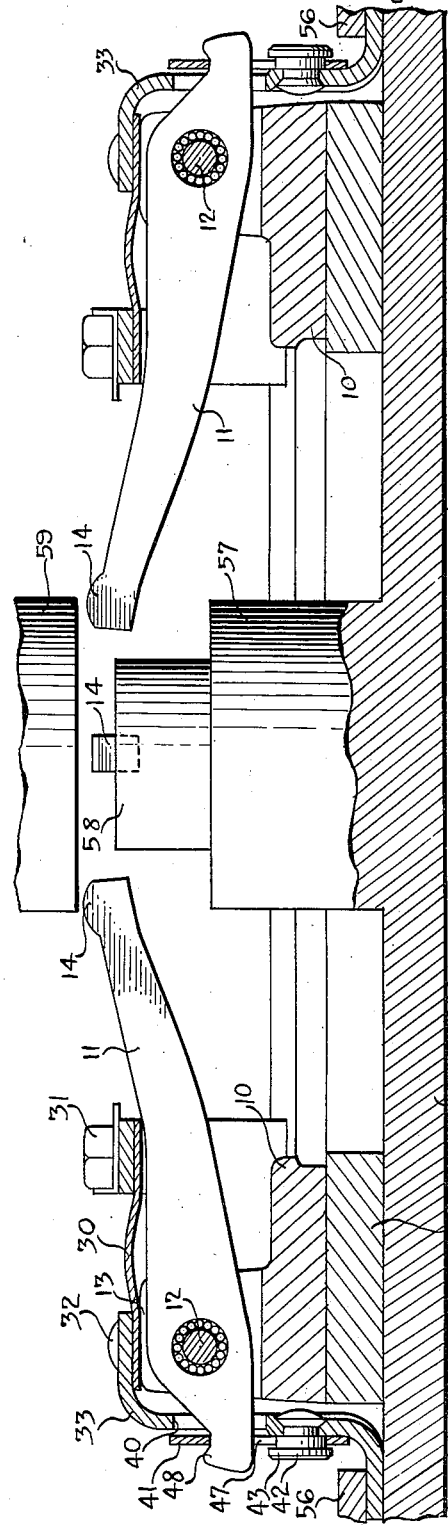
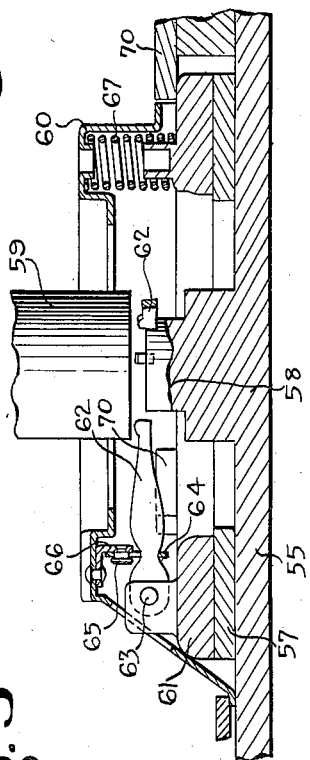
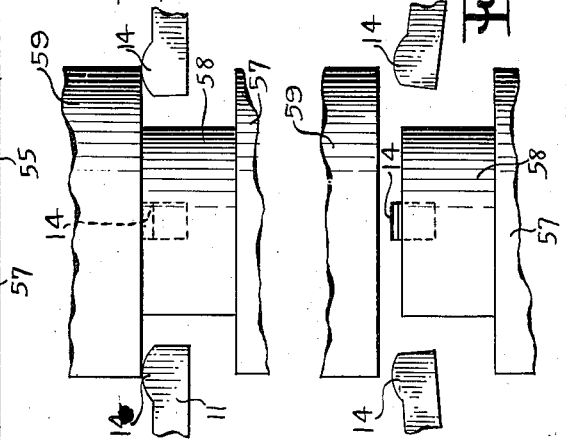
INVENTOR.
Ernest E. Wemp
BY
Barnes, Kisselle, Laughlin & Raisch
ATTORNEYS.

Patented Mar. 11, 1941

2,234,460

UNITED STATES PATENT OFFICE 2,234,460

CLUTCH AND LEVER SYSTEM THEREFOR

Ernest E. Wemp, Detroit, Mich.

Application July 29, 1938, Serial No. 222,040
Renewed July 14, 1939

26 Claims. (Cl. 192—68)

This invention relates to a clutch which has a plurality of clutch operating levers, and to the method of constructing the clutch.

In a clutch having a plurality of clutch operating levers, to which power is applied for clutch actuation, there is usually a shiftable member having a surface in one plane which engages the levers to actuate them. The portions of the levers so engaged should, for the best clutch operation, lie in a common plane so that the levers are engaged and actuated simultaneously. Heretofore it has been the practice, in clutches commercially constructed, to incorporate some adjustment feature so that these portions of the levers may be adjusted into a common plane. Such an adjustment may reside in adjustable contact pieces for engaging the shiftable member, or adjustment features for the fulcrum point or load point.

This invention aims to provide a clutch wherein such adjustment features are not needed. Due to commercial tolerances and unavoidable variations in machining operations and the like, the normal condition is that, in an initial clutch assembly, the levers will probably not be in proper alignment. This disalignment usually results in the portions of the levers to be engaged by the actuating or thrust member not being in a common plane. This invention contemplates the provision of a metal element or elements which is preloaded or overloaded in the manufacture of the clutch to stress the metal beyond its elastic limit to bring the said portions of the levers into a common plane. The metal is subjected to an overload in excess of that to which it will be subjected in normal use, and this overload is preferably applied through the levers themselves, while the parts are in an assembled relationship. In thus subjecting the structure to an overload through the levers, the said levers are aligned and the metal is stressed or deflected beyond its elastic limit so that upon the release of the load, the levers remain in alignment. The elastic metal elements advantageously comprise the fulcrums for the levers and may take the form of elastic metal plates or links.

A structure for carrying out the invention is shown herein, and although this structure is specifically described it will be understood that the particular structure may be varied within the scope of the appended claims and equivalents thereof.

Fig. 1 is a general view illustrating a clutch and operating means therefor constructed in accordance with the invention.

Fig. 2 is a view showing the clutch largely in rear elevation with some parts shown in section.

Fig. 3 is an enlarged cross-sectional view taken substantially on line 3—3 of Fig. 2, showing the clutch in engaged position.

Fig. 4 is a view similar to Fig. 3 showing the clutch disengaged.

Fig. 5 is a sectional view taken substantially on line 5—5 of Fig. 4.

Fig. 6 is a view taken substantially on line 6—6 of Fig. 4 showing the fulcrum plate.

Fig. 7 is a perspective view of the fulcrum plate.

Fig. 8 is a view illustrating one way of subjecting the structure to an overload to stress the fulcrum plates beyond their elastic limit.

Fig. 9 is a view showing the overload applied.

Fig. 10 is a view similar to Fig. 9 showing the parts after the overload has been relieved.

Fig. 11 is a view similar to Fig. 8 illustrating a different sort of clutch which may be constructed in accordance with the invention.

The general clutch construction illustrated herein is the one disclosed and claimed in co-pending application Serial No. 198,389, filed March 28, 1938. In this clutch the force for engaging the same resides in a spring positioned outside the clutch structure itself and operating through mechanical means including the clutch levers. This structure may be generally described as follows: The crankshaft of an engine is shown at 1 mounted in a suitable bearing 2 for taking end thrusts, while the fly-wheel is indicated at 3. A driven shaft is shown at 4 upon which a clutch driven member is mounted. The driven member includes a hub 5 having a splined connection with the shaft and a disc portion 6 connected to the hub by means of vibration dampening coil springs 7 and carrying in its outer zone friction facings 8 and 9. The disc may be constructed so that the facings are yieldingly mounted so as to separate from each other when the clutch is disengaged, as shown in Fig. 4, and to pack toward each other as the clutch is engaged, as shown in Fig. 3.

The facings of the driven disc are arranged to be packed between the fly-wheel and a pressure plate 10. A plurality of clutch levers, three of which are shown, and each indicated at 11, are pivotally mounted as at 12 to projecting bosses 13 of the pressure plate. The inner ends of the levers, as shown at 14, are arranged to have power applied thereto through an axially shiftable thrust bearing 15. This bearing may be mounted upon an axially shiftable sleeve 16 arranged to be shifted by a yoke 17 mounted upon a rock shaft 18. A member having an arm 19 is nonrotatably secured to the shaft and it has a screw abutment 20 arranged to contact with an abutment 21 on a clutch pedal or lever 22 rockably mounted on the shaft 18 or on some other axis member. The said member has an arm 23 secured at 24 to a rod 25 which slides through a sleeve 26, the sleeve being pivotally mounted as at 27, while a compression spring 28 is disposed between the sleeve 26 and a collar 29. The pivotal connection 24 swings with arcuate movement from the full line position as shown at A, for instance, Fig. 1, to B, as shown in dotted lines.

The pressure plate is mounted for axial movement and is driven with the fly-wheel. For this purpose flexible sheet metal plates 30 are used, these plates being of segmental type secured at their inner edges to the pressure plate by cap screws 31, and at their outer edges by rivets 32 to brackets 33. Each bracket is shaped to extend across or bridge the pressure plate, as illustrated in Figs. 3 and 4, and has a forward portion fixed to the fly-wheel by cap screws 35. This is one way to mount the pressure plate although the pressure plate may be mounted in other ways so far as this invention is concerned.

The clutch may include spring means for retracting the pressure plate for clutch disengagement. Such spring means may reside in coil springs 36 each with its coil disposed around the projecting fulcrum pin 12 for each lever. One end of each coil spring extends outwardly through an aperture in the adjacent bracket, as illustrated at 38, while the other may engage the pressure plate, as illustrated at 39. The ends 38 and 39 of the spring shown in Fig. 3 tend normally to move toward each other, thus to force the load point 12 and therefore the pressure plate to the right or to disengaged position, as shown in Fig. 4. These are relatively light retracting springs.

Each lever extends out through its bracket, for which purpose each bracket has an aperture 40, and the outer end of the lever is fulcrumed. A fulcrum plate for each lever is generally designated 41. Each fulcrum plate may be secured to the bracket by a headed stud 42 riveted to the bracket with the stud having a neck portion 43 around which the fulcrum plate fits. This fit is fairly loose so that the fulcrum plate is free to rock thereon around the axis of the stud or to rock or to cock thereon, so that the fulcrum plate may assume different angular positions relative to the axis of the stud. The fulcrum plate has a recess 44 for fitting around the portion 43 of the stud, as shown in Fig. 6. The outer end of the lever passes through the fulcrum plate and may fit nicely between the side walls of a recess 45 and pivot against the end wall 46, for which purpose the lever is formed with an undercut 47 defined by an overhanging part 48.

As shown in Figs. 6 and 7, the fulcrum plate is cut out with a shape somewhat of that of a cloverleaf, in that the recesses 44 and 45 open into a transversely disposed, elongated opening 47' preferably with rounded end portions 48'. This structure forms connecting strips of metal 50 which take the forces transmitted between the lever and the stud 43.

The fulcrum plate is preferably made of steel having a sufficient carbon content so that it may be adequately hardened, and the grain of the metal preferably runs in a direction substantially parallel to the center line between the stud 43 and the end of the lever 11. It will be noted that the metal at 50 is located some distance away laterally from a center line between the lever and the stud, so that the plate is adapted for considerable deflection.

In the particular clutch illustrated herein the engagement forces are delivered by the spring 28 acting through the arms 19—23 and yoke 17. The position of the parts shown in Fig. 1 is in clutch-engaged position, and the spring forces at this time tend to rock the shaft and yoke 17 clockwise; this delivers axial forces to the sleeve 16 tending to shift it to the left. The bearing 15 engages the inner ends of the levers and the levers are caused to rock clockwise (Fig. 3) around the fulcrum points, and the pressure plate is thereby moved to the left to clutch engagement. To release the clutch the operator depresses the lever 22 as by means of the foot and the projection 21 engages the screw 20 and rocks the part 19—23 counterclockwise, retracting the sleeve 16 so that the springs 36 retract the pressure plate from the Fig. 3 position to the Fig. 4 position, to release the clutch. As set forth in the above mentioned application, the point of connection 24 shafts from position A to position B for full clutch disengagement and thus the moment of the spring is materially reduced since the point B moves into close proximity to the center line C. With this arrangement the clutch may be held disengaged with very little effort.

It is within the invention to incorporate the fulcrum plates in a clutch which embodies packing springs directly associated therewith, and wherein the clutch is released by shifting the clutch throw-out bearing 16 to rock the levers 11 clockwise against the action of the packing springs. In either event, however, power is applied to the inner ends of the lever for such clutch operation purposes. As shown herein, the application of the power to the inner ends of the levers serves for clutch engagement although the power may be applied for clutch disengagement.

The thrust bearing 15 has a surface which lies in a single plane and which engages the ends of the levers, and, as mentioned above, the engaged ends 14 of the levers 11 should lie in a common plane for the best clutch operation. However, due to commercial tolerances, unavoidable variations in machine operations, and the like, when a clutch is initially assembled there may be and usually is some difference in the planes of the portions 14 of the levers. In accordance with this invention the fulcrum plates are subjected to an overload in the manufacture of the clutch so that they are stressed or deflected beyond their elastic limit and thus take a set. In this way, the inner ends of the levers are positioned in a common plane, and this position is maintained and no adjustment features are required.

Figs. 8, 9 and 10 illustrate this treatment of a clutch of the type shown in Fig. 1. A sub-assembly of levers, pressure plate, brackets and fulcrum plates, is disposed on a suitable device or fixture 55 and the brackets 33 are held down either by bolting them or by readily shiftable clamping elements 56. The fixture has a raised part 57 upon which the pressure plate rests, this part 57 corresponding to the thickness of the driven member of the clutch. The fixture has a center projection 58 which underlies a pressure-applying member 59 for applying the overload forces to the inner ends of the levers.

It will be noted that the inner ends of the levers in Fig. 8 are illustrated as lying in different planes, this illustration being somewhat exaggerated. Furthermore, the parts of the clutch structure are so designed that all of the inner ends of the levers are too high, so to speak. The result is that an overload is placed upon all of the fulcrum plates so that the fulcrum plate for the lever having its inner end lowermost as Fig. 8 is viewed, is stressed beyond its elastic limit.

Pressure is now applied by the plunger 59 and the levers are forced downwardly until the plunger strikes the stop 58 as shown in Fig. 9. This subjects the fulcrum plates to an overload in excess of any load to which they will be subjected in normal use. The fulcrum plates are deflected beyond their elastic limits and, therefore, take a "set." The plates are all deflected beyond their elastic limit to a given point as determined by the stop 58. The fulcrum plates are of the same stock and have substantially the same elasticity and, therefore, when the pressure is removed as shown in Fig. 10, the elasticity in the plates causes the inner ends of the levers to shift back or away from the stop 58 a substantially uniform distance. Accordingly, the inner ends of the levers are now positioned in a common plane and this position will be maintained in the final clutch assembly. The fulcrum plates are so arranged and constructed that they will not be stressed beyond their elastic limit in normal clutch use.

In Fig. 11 an arrangement is shown similar to Fig. 8, illustrating the application of the invention to a clutch which is engaged by springs located within the clutch structure itself and disengaged by pressure applied to the levers. In this case the clutch may have a cover plate 60, a pressure plate 61, levers 62 pivotally mounted to the pressure plate as at 63 and fulcrum plates 64 which may be similar to the fulcrum plates 41, and mounted on studs 65 carried by brackets 66. The clutch packing springs 67 lie between the pressure plate and cover plate.

This clutch may be disposed on a fixture similar to the one shown in Fig. 8, and the same reference characters are applied to similar parts. Pressure is applied by the plunger 59 and the fulcrum plates are stressed beyond their elastic limit to a point determined by the stop 58. In this form, however, the levers are of the first order and therefore the tendency is to retract the pressure plate from the fixture. Accordingly, with a clutch of this nature the fixture will also include holddown elements 70 suitably arranged to engage the pressure plate to hold it down against the fixture when pressure is applied to the levers.

The invention is particularly advantageous for use with a clutch having levers of the second order. The available space for providing lever length is limited in an automotive clutch and a greater lever advantage can be obtained with a lever of the second order than can be obtained with a lever of the first order having the same over-all length. Therefore, a given differential in the planes of the inner ends of levers of the second order can be rectified with less deflection of the fulcrum plates beyond their elastic limits. However, the invention is not limited to levers of the second order.

The metal elements which are stressed beyond their elastic limit may be anywhere between the power receiving ends of the levers and the flywheel 3; that is to say, the metal elements which are stressed may be anywhere in the lever system, and indeed may be the levers themselves. Those claims which call for the stressing of some of the parts in the lever system are to be thus construed. Where reference is made to elastic metal, the intention is to call for metal sufficiently elastic for the purpose.

I claim:

1. In a clutch having a plurality of levers operable for clutch operation, the levers having portions engageable by operating means for pivoting the levers, mounting means for the levers comprising elements, some of which are deflected beyond their elastic limit and thereby given a set to rectify possible error due to manufacturing variations and thereby locate the said portions of the levers in a predetermined position relative to each other.

2. In a clutch having a plurality of levers operable for clutch operation with the levers having portions engageable by operating means for pivoting the levers, and mounting means for at least one lever comprising, an elastic metal element deflected beyond its elastic limit and thereby given a set to rectify possible error due to manufacturing variations and thereby locate said portion of said one lever in a predetermined position relative to said portions of the other lever.

3. In a clutch having a plurality of levers operable for clutch operation, means for engaging portions of the levers to pivot the levers for clutch operation, and a steel mounting element for each lever deflected beyond its elastic limit for positioning said portions of the levers substantially in a common plane.

4. In a clutch having a lever system including a plurality of levers having power receiving parts and which are operable for clutch operation, and elastic means in the lever system stressed beyond the elastic limit of the material thereof and thereby given a set, to rectify possible error due to manufacturing variations and thereby locate said power receiving parts in substantial alignment.

5. In a clutch having a lever system including a plurality of levers having power receiving parts and which are operable for clutch operation, and means in the lever system stressed beyond the elastic limit of the material thereof and thereby given a set, to rectify possible error due to manufacturing variations and thereby locate said power receiving parts in a predetermined position relative to each other.

6. In a clutch having a plurality of levers operable for clutch operation, a shiftable member for engaging portions of the levers to pivot the levers for clutch operation, a steel mounting element for each lever, all of said elements being deflected beyond their elastic limit from an initial normal position to a position where the said portions of the levers are substantially in a common plane.

7. In a clutch having a plurality of levers operable for clutch operation, means for engaging portions of the levers to pivot the levers for clutch operation, a metal fulcrum plate for each lever, each fulcrum plate being deflected beyond its elastic limit and to such an extent that the said portions of the levers are disposed substantially in a common plane.

8. In a clutch having a plurality of levers operable for clutch operation, means for engaging portions of the levers to pivot the levers for clutch operation, an elastic metal fulcrum plate for each lever initially serving to position said portions of the levers in one or more planes which may vary incident to commercial tolerances, variations in machining operations and the like, all of said fulcrum plates being deflected beyond their elastic limit and to such an extent that the said portion of the levers lie substantially in a common plane.

9. In a clutch having a plurality of levers operable for clutch operation, means for engaging portions of the levers to pivot the levers for clutch operation, a tension link of elastic metal forming a fulcrum for each lever, each tension link being stressed beyond its elastic limit and each to such a degree beyond its elastic limit that the portion of the lever associated therewith lies in a plane substantially common with said portions of the other levers.

10. In a clutch, a plurality of levers shiftable for clutch actuation, a fulcrum for each lever comprising a tension link of elastic metal having an apertured body anchored on one side of the aperture and having a fulcrum surface on the opposite side of the aperture for the lever, said aperture extending laterally beyond the location of the anchor and the lever, the metal of each tension link being deflected beyond its elastic limit so that the power-receiving portion of the lever associated therewith lies in a plane substantially common to the same portions of the other levers.

11. In a clutch having a plurality of levers shiftable for clutch actuation, an elastic metal link forming a fulcrum for each lever, said link having an aperture therein, a stud pivotally disposed in the link on one side of the aperture and forming an anchor therefor, said link having a portion for engagement with a lever for fulcrum purposes, and said portion being disposed on the opposite side of the aperture from the stud, said aperture being elongated in a direction transverse to the center line between the stud and the lever, the metal of each link being deflected beyond its elastic limit to such an extent that the lever associated therewith has its power-receiving end disposed in a plane substantially common to the power-receiving ends of the other levers.

12. In a clutch having a plurality of levers shiftable for clutch actuation, a steel fulcrum plate for each lever apertured substantially in the form of a three-leaf clover and stem portion, the stem portion of the aperture adapted to receive the lever, the leaf portion opposite the stem adapted to receive an anchoring member, the metal of each plate being stressed beyond its elastic limit, each to the extent that the power-receiving ends of the levers lie substantially in a common plane.

13. In a clutch having a plurality of levers shiftable for clutch actuation, a steel fulcrum plate having an aperture therein shaped to define four arms or portions located substantially ninety degrees apart, an anchoring member disposed in one portion of the aperture, a lever disposed in and fulcruming in a portion of the aperture opposite that having the anchoring means, the other two opposite portions of the aperture defining metal parts for taking the load.

14. In a clutch having a plurality of levers shiftable for clutch actuation, a fulcrum plate of elastic steel having an aperture therein shaped to define four arms or portions located substantially ninety degrees apart, an anchoring member disposed in one portion of the aperture, a lever disposed in and fulcruming in a portion of the aperture opposite that having the anchoring means, the other two opposite portions of the aperture defining metal parts for taking the load, and the grain of the steel running in a direction substantially parallel to a center line between the portions with the anchoring means and lever.

15. In a clutch having a plurality of levers shiftable for clutch action, a fulcrum plate of elastic steel substantially of circular form and having an aperture therein shaped to define four arms or portions of the aperture located substantially ninety degrees apart, an anchoring member disposed in one portion of the aperture, a lever disposed in and fulcruming in a portion of the aperture opposite that having the anchoring means, the other two opposite portions of the aperture defining laterally spaced metal parts for taking the load.

16. In a clutch having a plurality of levers shiftable for clutch actuation, a lever fulcrum plate of steel having means for receiving an anchor and means for receiving a lever, said plate having separated metal parts spaced laterally from the said two means for taking the load, said plate being stressed beyond its elastic limit to such an extent that the power-receiving end of its lever is disposed in a plane substantially common to the planes of the power-receiving ends of other levers.

17. In a clutch having a plurality of levers shiftable for clutch actuation, a fulcrum plate of steel having an aperture therein shaped to define four arms or portions located substantially ninety degrees apart, an anchoring member disposed in one portion of the aperture, a lever disposed in and fulcruming in a portion of the aperture opposite that having the anchoring means, the other two opposite portions of the aperture defining metal parts for taking the load, said fulcrum plate being stressed beyond its elastic limit to such an extent that the power-receiving end of the lever associated therewith lies in a plane substantially common to the plane of the power-receiving ends of the other levers.

18. The method of aligning a plurality of clutch levers which have mounting means of elastic metal, which comprises, subjecting the mounting means to a load to stress the mounting means beyond the elastic limit of the metal to set the metal of the mounting means so that the levers are substantially aligned.

19. The method of aligning a plurality of clutch levers which have mounting means of elastic metal, which comprises, subjecting the mounting means simultaneously to a load to stress the mounting means beyond the elastic limit of the metal, and limiting the stress of all mounting means at a given limit location to set the metal of the mounting means so that the levers are substantially aligned.

20. The method of aligning a plurality of clutch levers which have pivot means of elastic metal which comprises, subjecting the levers to a load in excess of the load to which they will be subjected in use to stress the pivot means beyond the elastic limit of the metal to position the levers in substantial alignment.

21. The method of aligning a plurality of clutch levers which have tension type fulcrum plates of elastic metal which comprises, subjecting the levers to a load in excess of the load to which they will be subjected in use to stress the fulcrum plates beyond the elastic limit of the metal, and limiting the stress of all fulcrum plates to a given limit location to substantially align the levers.

22. The method of aligning the power-receiving ends of the levers in a clutch lever system which transmits the applied power from said receiving ends to certain clutch parts which comprises, subjecting the system to load to stress the metal of some of the parts in the system beyond the elastic limit of the metal and thereby give the stressed metal a set with the said receiving ends of the levers in substantial alignment.

23. A clutch having a lever system operable for clutch operation and including levers having power-receiving ends, some of the parts in the lever system being stressed beyond their elastic limit and thereby set with the power-receiving ends of the levers in substantial alignment.

24. In a clutch having a plurality of levers operable for clutch operation, the levers having power-reeciving ends, means operably connecting the levers to some of the clutch parts for the transmission of the applied power through the levers and means to clutch parts, some of the parts which transmit such power being stressed beyond the elastic limit of the metal and set with the power-receiving ends of the levers in substantial alignment.

25. The method of placing a plurality of levers in a clutch lever system in a predetermined position relative to each other which comprises, subjecting the system to a load to stress parts therein beyond the elastic limit of the material thereof to set the material and rectify possible error due to manufacturing variations and thereby position the levers in a predetermined manner relative to each other.

26. The method of placing a plurality of levers in a clutch lever system in a predetermined position relative to each other which comprises, subjecting the system to a load substantially simultaneously applied to the levers to stress parts of the system beyond the elastic limit of the material thereof to set the metal parts and rectify possible error due to manufacturing variations and thereby position the levers in a predetermined manner relative to each other.

ERNEST E. WEMP.